(12) United States Patent
Huang

(10) Patent No.: US 11,922,608 B2
(45) Date of Patent: Mar. 5, 2024

(54) IMAGE PROCESSING CIRCUIT AND ASSOCIATED IMAGE PROCESSING METHOD

(71) Applicant: Realtek Semiconductor Corp., HsinChu (TW)

(72) Inventor: Yu-Shiang Huang, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 833 days.

(21) Appl. No.: 17/013,892

(22) Filed: Sep. 8, 2020

(65) Prior Publication Data

US 2021/0090221 A1 Mar. 25, 2021

(30) Foreign Application Priority Data

Sep. 20, 2019 (TW) .................................. 108134015

(51) Int. Cl.
*G06T 5/00* (2006.01)
*G06T 5/50* (2006.01)

(52) U.S. Cl.
CPC .............. *G06T 5/008* (2013.01); *G06T 5/003* (2013.01); *G06T 5/50* (2013.01); *G06T 2207/20224* (2013.01)

(58) Field of Classification Search
CPC ........... G06T 5/008; G06T 5/003; G06T 5/05; G06T 2207/20224; G06T 5/20
See application file for complete search history.

(56) References Cited

U.S. PATENT DOCUMENTS

2014/0292820 A1* 10/2014 Park ....................... G06T 11/001
345/83
2018/0033154 A1* 2/2018 Suzuki .................... G06T 5/008

FOREIGN PATENT DOCUMENTS

| CN | 102456223 A | 5/2012 | |
| CN | 103810675 A | 5/2014 | |
| TW | I433053 B | * 4/2014 | |
| WO | WO-2006025486 A1 | * 3/2006 | ............. G06T 5/008 |

* cited by examiner

*Primary Examiner* — Mekonen T Bekele
(74) *Attorney, Agent, or Firm* — Winston Hsu

(57) ABSTRACT

The present invention provides an image processing circuit including a receiving circuit, a reference value calculating circuit, a center luminance value calculating circuit and an output circuit. In the operations of the image processing circuit, the receiving circuit receives image data. The reference value calculating circuit determines a first reference value and a second reference value corresponding to a plurality of pixels of the image data. The center luminance value calculating circuit refers to the first reference value and the second reference value to generate a center luminance value. The output circuit determines output luminance values of the plurality of pixel values according to the image data, the first reference value and the second reference value.

16 Claims, 3 Drawing Sheets

IMAGE PROCESSING CIRCUIT AND ASSOCIATED IMAGE PROCESSING METHOD

BACKGROUND OF THE INVENTION

1. Field of the Invention

The invention relates to an image processing circuit, more particularly to an image processing circuit for improving sharpness of an image.

2. Description of the Prior Art

After an image is enlarged by the conventional way, there will be some areas at the edges of an object with increasing or decreasing luminance, and the degree of increasing or decreasing is slow, making its sharpness to be worse than the image that has not been enlarged. There are some existing algorithms to improve the sharpness of these areas, for example, using the luminance at two sides of these areas to replace the luminance of the pixels in these areas. However, there are two drawbacks to this method. One is that the original luminance changes only slightly, but the output luminance changes significantly. The other is that the edge width of the object cannot be arbitrary adjusted.

SUMMARY OF THE INVENTION

Therefore, it is an objective of the invention to provide an image processing circuit, which can avoid the defects in the prior art in the case of effectively improving the sharpness of the image, so as to solve the problems described in the prior art.

In an embodiment of the invention, an image processing circuit comprises a receiving circuit, a reference value calculating circuit, a center luminance value calculating circuit and an output circuit. The receiving circuit is configured to receive image data. The reference value calculating circuit is configured to determine a first reference value and a second reference value corresponding to a plurality of consecutive pixels of the image data, wherein the first reference value and the second reference value are respectively a highest luminance value and a lowest luminance value of two edge pixels of the plurality of consecutive pixels after being processed by the image processing circuit. The center luminance value calculating circuit is configured to calculate a center luminance value according to the first reference value and the second reference value. The output circuit is configured to determine output luminance values of the plurality of consecutive pixels according to the image data, the first reference value, the second reference value and the center luminance value.

In another embodiment of the invention, an image processing method comprises:
receiving image data; determining a first reference value and a second reference value corresponding to a plurality of consecutive pixels of the image data, wherein the first reference value and the second reference value are respectively a highest luminance value and a lowest luminance value of two edge pixels of the plurality of consecutive pixels after being processed by the image processing method; calculating a center luminance value according to the first reference value and the second reference value; and determining output luminance values of the plurality of consecutive pixels according to the image data, the first reference value, the second reference value and the center luminance value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
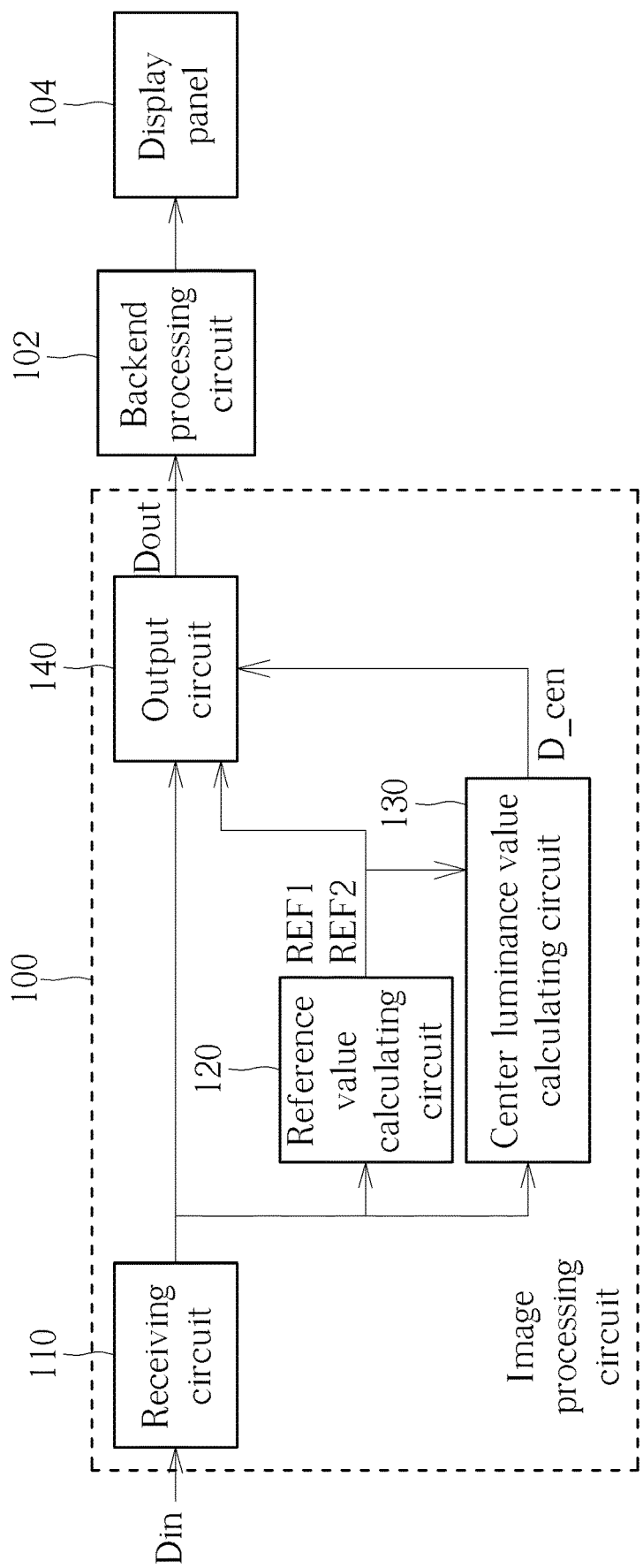
FIG. 1 is a schematic diagram of an image processing circuit according to an embodiment of the invention.

FIG. 1 is a schematic diagram of an image processing circuit 100 according to an embodiment of the invention. As shown in FIG. 1, the image processing circuit 100 comprises a receiving circuit 110, a reference value calculating circuit 120, a center luminance value calculating circuit 130 and an output circuit 140. In this embodiment, the image processing circuit 100 is configured to receive image data (e.g. an image frame) Din and sharpen the image data to generate an output image Dout. The output image Dout is further processed by a backend processing circuit 102 and then transmitted to a display panel 104 for being displayed thereon.

In the operations of the image processing circuit 100, the receiving circuit 110 is configured to receive image data Din. The reference value calculating circuit 120 is configured to determine a first reference value REF1 and a second reference value REF2 corresponding to a plurality of consecutive pixels of the image data Din. The first reference value REF1 and the second reference value REF2 are respectively the highest luminance value and the lowest luminance value of two edge pixels of the plurality of consecutive pixels after being processed by the image processing circuit 100, or the highest luminance value and the lowest luminance value of the plurality of consecutive pixels after being processed by the image processing circuit 100. As an example, suppose that the pixels are utilized to represent an edge of an object, and the luminance values of the pixels may be, from the left to the right, an increasing sequence or a part of the luminance values of the pixels may be an increasing sequence. The first reference value REF1 may be the highest luminance value of the rightmost pixel among these pixels after being processed by the image processing circuit 100, and the second reference value REF2 may be the lowest luminance value of the leftmost pixel among these pixels after being processed by the image processing circuit 100. Next, the center luminance value calculating circuit 130 is configured to calculate a center luminance value D_cen according to the first reference value REF1, the second reference value REF2 and the luminance values of the pixels. Finally, the output circuit 140 is configured to determine output luminance values of the plurality of consecutive pixels and accordingly generate an output image Dout according to the image data Din, the first reference value REF1, the second reference value REF2 and the center luminance value D_cen.

To be more specific, regarding the reference value calculating circuit 120, for each pixel of the plurality of pixels, the reference value calculating circuit 120 is configured to calculate a cumulative luminance value increment and a cumulative luminance value decrement, subtract the cumulative luminance value decrement corresponding to the pixel from the luminance value of the pixel to obtain an initial first reference value, and add the cumulative luminance value increment corresponding to the pixel to the luminance value of the pixel to obtain an initial second reference value, wherein the cumulative luminance value increment corresponding to a pixel is obtained by subtracting the luminance value of a pixel at a previous position from the luminance value of the pixel to obtain a corresponding subtraction result and then adding the subtraction result to the cumulative luminance value increment corresponding to the pixel at the previous position when the luminance value of the pixel is greater than the luminance value of the pixel at the previous position, and the cumulative luminance value decrement corresponding to a pixel is obtained by subtracting the luminance value of the pixel from the luminance value of a pixel at a previous position to obtain a corresponding subtraction result and then adding the subtraction result to the cumulative luminance value decrement corresponding to the pixel at the previous position when the luminance value of the pixel is smaller than the luminance value of the pixel at the previous position. In this embodiment, the pixel at a previous position refers to an adjacent pixel in a predetermined direction, as an example, the adjacent pixel on the left. Next, after obtaining the initial first reference value and the initial second value for each pixel, the reference value calculating circuit 120 is configured to select the highest value among the initial first reference values of the plurality of pixels as the first reference value REF1 and select the lowest value among the initial second reference values of the plurality of pixels as the second reference value REF2. As an example, suppose that the image data Din comprises a plurality of consecutive pixels in the same row or in the same column of the image frame, and suppose that the luminance values of the pixels are 50, 60, 70, 69, 79 and 89, and when calculating the initial first reference value, the initial first reference value cannot be lower than the luminance value of the pixel at the position "0", and when calculating the initial second reference value, the initial second reference value cannot be higher than the luminance value of the pixel at position "0". The cumulative luminance value increment, cumulative luminance value decrement, initial first reference value and the initial second reference value calculated by the reference value calculating circuit 120 in this example may refer to the following Table 1.

In the embodiment shown in Table 1, for the pixel at the position "1", the cumulative luminance value increment is obtained by "60−50=10", the initial first reference value is obtained by "60−0=60", and the initial second reference value is obtained by "60+10=70". However, since the obtained initial second reference value is greater than the luminance value "50" of the pixel at the position "0", the initial second reference value of the pixel at the position "1" is adjusted to the value "50". For the pixel at the position "2", the cumulative luminance value increment is obtained by "(70−60)+10=20", the initial first reference value is obtained by "70−0=70", and the initial second reference value is obtained by "70+20=90". However, since the obtained initial second reference value is greater than the luminance value "50" of the pixel at the position "0", the initial second reference value of the pixel at the position "2" is adjusted to the value "50". For the pixel at the position "3", since the luminance value of the pixel at the position "3" is lower than the luminance value of the pixel at the position "2", the cumulative luminance value increment of the pixel at the position "3" is the same as the cumulative luminance value increment of the pixel at the position "2", the initial first reference value is obtained by "69−1=68", and the initial second reference value is obtained by "69+20=89". However, since the obtained initial second reference value is greater than the luminance value "50" of the pixel at the position "0", the initial second reference value of the pixel at the position "3" is adjusted to the value "50", and the rest may be deduced by analogy. In the embodiment shown in Table 1, the highest value among the initial first reference values of the plurality of pixels that is selected as the first reference value REF1 is the value "88", and the lowest value among the initial second reference values of the plurality of pixels that is selected as the second reference value REF2 is the value "50".

In addition, if the luminance values of the pixels in the image data Din is substantially increasing but still having some slightly luminance decreasing, such as the luminance values 50, 49, 59, 69, 79 and 78 of the pixels, an adjustment value may be used when calculating the first reference value REF1 and the second reference value REF2, to avoid thick black or white shadows generated on the edges of the image. To be more specific, the cumulative luminance value increment, cumulative luminance value decrement, initial first reference value and the initial second reference value calculated by the reference value calculating circuit 120 in another example may refer to the following Table 2.

TABLE 1 the cumulative luminance value increment, cumulative luminance value decrement, initial first reference value and the initial second reference value are calculated by the reference value calculating circuit.

| Pixel position | 0 | 1 | 2 | 3 | 4 | 5 |
| --- | --- | --- | --- | --- | --- | --- |
| Original luminance value of the image data Din | 50 | 60 | 70 | 69 | 79 | 89 |
| Cumulative luminance value increment | 0 | 10 | 20 | 20 | 30 | 40 |
| Cumulative luminance value decrement | 0 | 0 | 0 | 1 | 1 | 1 |
| Initial first reference value | 50 | 60 | 70 | 68 | 78 | 88 |
| Initial second reference value | 50 | 50 | 50 | 50 | 50 | 50 |

TABLE 2 the cumulative luminance value increment, cumulative luminance value decrement, initial first reference value and the initial second reference value are calculated by the reference value calculating circuit.

| Pixel position | 0 | 1 | 2 | 3 | 4 | 5 |
| --- | --- | --- | --- | --- | --- | --- |
| Original luminance value of the image data Din | 50 | 49 | 59 | 69 | 79 | 78 |
| Cumulative luminance value increment | 0 | 0 | 10 | 20 | 30 | 30 |
| Cumulative luminance value decrement | 0 | 1 | 1 | 1 | 1 | 2 |
| Initial first reference value | 50 | 50 | 58 | 68 | 78 | 76 |
| Initial second reference value | 50 | 49 | 50 | 50 | 50 | 50 |

Regarding calculation of the adjustment value, the reference value calculating circuit 120 is configured to calculate a difference between the highest value among the initial first reference values and the luminance value of the pixel at the position "0" (that is, calculated by 78−50=28), calculate a difference between the lowest value among the initial second reference values and the luminance value of the pixel at the position "0" (that is, calculated by 50−49=1), and select the smaller one from the two calculated values (that is, 28 and 1) as the adjustment value. After that, the reference value calculating circuit 120 is configured to subtract the adjustment value from the highest value among the initial first reference values to obtain the first reference value REF1 and add the adjustment value to the lowest value among the initial second reference values to obtain the second reference value REF2. In this embodiment, the obtained first reference value REF1 will be 78−1=77, and the obtained second reference value REF2 will be 49+1=50.

Figure 2:
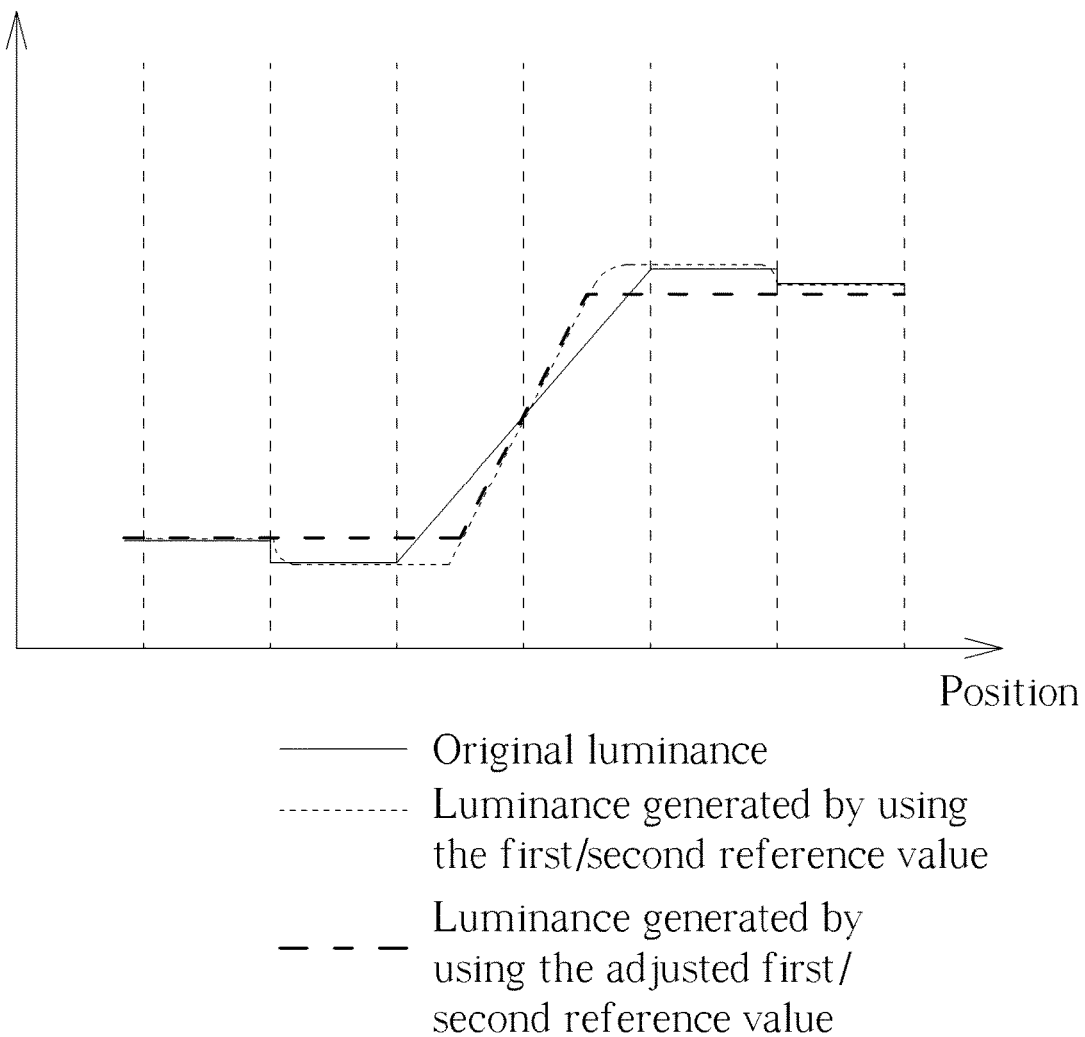
FIG. 2 is a schematic diagram showing the image data, the processed image data and the output image.

FIG. 2 is a schematic diagram showing the image data, the processed image data and the output image. Referring to FIG. 2, when the first reference value REF1 and the second reference value REF2 are directly selected from the highest value among the initial first reference values and the lowest value among the initial second reference values without using the adjustment value, thick black or white shadows will be generated on the edges as shown in FIG. 2 (that is, shown as the thinner dotted line, where luminance variation occurs at the edges). Therefore, in the embodiment of the invention, the adjustment value is used to adjust the highest value among the initial first reference values and the lowest value among the initial second reference values, so as to make the edges to have a uniform luminance (that is, shown as the thicker dotted line in FIG. 2).

In the embodiments shown in Table 1 and Table 2, the first reference value REF1 and the second reference value REF2 are determined according to the luminance variation along a single direction. However, in other embodiments, the reference value calculating circuit 120 may also determine first reference value REF1 and the second reference value REF2 according to the luminance variations in two directions. For example, another embodiment is shown in the following Table 3.

TABLE 3 the cumulative luminance value increment, cumulative luminance value decrement, initial first reference value and the initial second reference value are calculated by the reference value calculating circuit.

| Pixel position | −4 | −3 | −2 | −1 | 0 | 1 | 2 | 3 | 4 |
|---|---|---|---|---|---|---|---|---|---|
| Original luminance value of the image data Din | 90 | 90 | 85 | 80 | 75 | 65 | 55 | 50 | 50 |
| Cumulative luminance value increment | 15 | 15 | 10 | 5 | 0 | 0 | 0 | 0 | 0 |
| Cumulative luminance value decrement | 0 | 0 | 0 | 0 | 0 | 10 | 20 | 25 | 25 |
| Initial first reference value | 90 | 90 | 85 | 80 | 75 | 75 | 75 | 75 | 75 |
| Initial second reference value | 75 | 75 | 75 | 75 | 75 | 65 | 55 | 50 | 50 |

In Table 3, the cumulative luminance value increment, cumulative luminance value decrement, the initial first reference value and the initial second reference value are calculated based on the pixel at the position "0", and the calculations are respectively proceeded in two directions from the pixel at the position "0" toward the left side and right side of the pixel at the position "0". In this embodiment, the first reference value REF1 is "90" and the second reference value is "50".

Next, regarding the center luminance value calculating circuit 130, the center luminance value calculating circuit 130 is configured to perform a weighted average operation on the first reference value REF1 and the second reference value REF2 to generate an initial central luminance value, calculate at least one object main body component according to a difference between a peak value and a valley value of the luminance values of the plurality of pixels, and calculate the center luminance value D_cen according to the initial central luminance value and the object main body component. The luminance values shown in Table 4 are provided for illustration.

TABLE 4

| Exemplary luminance values of the image data. | | | | | | | | | |
|---|---|---|---|---|---|---|---|---|---|
| Pixel position | −4 | −3 | −2 | −1 | 0 | 1 | 2 | 3 | 4 |
| Original luminance value of the image data Din | 40 | 30 | 30 | 40 | 50 | 58 | 66 | 66 | 58 |

In the embodiment shown in Table 4 and referring to the calculation as illustrated in the afore-mentioned embodiments, the first reference value REF1 calculated by the reference value calculating circuit 120 is "66", the second reference value REF2 calculated by the reference value calculating circuit 120 is "30", the center luminance value calculating circuit 130 is configured to perform a weighted average operation on the first reference value REF1 and the second reference value REF2 (in this embodiment, an average operation is adopted for illustration) to generate an initial central luminance value "48", the object main body component at the right side of the pixel at the position "0" is obtained by "(66−58)=8" and the object main body component at the left side of the pixel at the position "0" is obtained by "(30−40)=−10". Next, the center luminance value calculating circuit 130 may directly add the initial central luminance value, the maximum value of the object main body component (that is, the object main body component "8" at the right side of the pixel at the position "0") and the minimum value of the object main body component (that is, the object main body component "−10" at the left side of the pixel at the position "0") to obtain the center luminance value D_cen (that is, 48+8−10=46).

In addition, regarding the example in which the center luminance value calculating circuit 130 is configured to perform a weighted average operation on the first reference value REF1 and the second reference value REF2, if the weighting value of the first reference value REF1 is adjusted higher and the weighting value of the second reference value REF2 is adjusted lower, the output image will look like that the width of a brighter object is wider and the width of a darker object is narrower. In addition, if the weighting value of the first reference value REF1 is adjusted lower and the weighting value of the second reference value REF2 is adjusted higher, the output image will look like that the width of a brighter object is narrower and the width of a darker object is wider. Therefore, the weighting values may be flexibly controlled according to the requirement or preference of the user.

In addition, the object main body component may be further adjusted such that the edges of an object can have different widths. For example, if it is desired to make the object with lower luminance thinner, the maximum value of the object main body component may be decreased; if it is desired to make the object with higher luminance thinner, the minimum value of the object main body component may be increased. For example, the minimum value of the object main body component may be multiplied by a ratio (for example, 0.5) and then added to the maximum value of the object main body component to obtain the adjusted maximum value of the object main body component (in the embodiment shown in Table 4, the adjusted maximum value of the object main body component is obtained by "(8−0.5*10=3). Meanwhile, the center luminance value D_cen becomes "(48+3−10=41)".

Finally, regarding the operations of the output circuit 140, for each pixel, the output circuit 140 is configured to determine output luminance value of the pixel according to the luminance of the pixel, the center luminance value and a sharpness adjustment ratio, wherein the output luminance value of the pixel is not higher than the first reference value REF1 and is not lower than the second reference value REF2. For example, for a pixel, the output luminance value may be calculated by using the following equation: (Original luminance value+ sharpness adjustment ratio*(the luminance value of the pixel at the position "0"−the center luminance value). Suppose that the original luminance value of the current pixel is "50", the luminance value of the pixel at the position "0" is "50", the center luminance value D_cen is "41" and the sharpness adjustment ratio is "2", the output luminance value of the pixel may be calculated as: "(50+2*(50−41)=68)". However, since the result exceeds the first reference value REF1, the output luminance value of the pixel is adjusted to "66".

It should be noted that the "luminance value" described in the above embodiments may comprise different pixel values according to the different color swatches. Take the RGB color swatch as an example, the aforementioned luminance calculation comprises the calculations of the red pixel value, the green pixel value and the blue pixel value. Take the YUV color swatch as an example, the aforementioned luminance calculation is the calculation of the luminance Y. Take the CMYK color swatch as an example, the aforementioned luminance calculation comprises the calculations of the cyan pixel value, the magenta pixel value, the yellow pixel value and the black pixel value.

Figure 3:
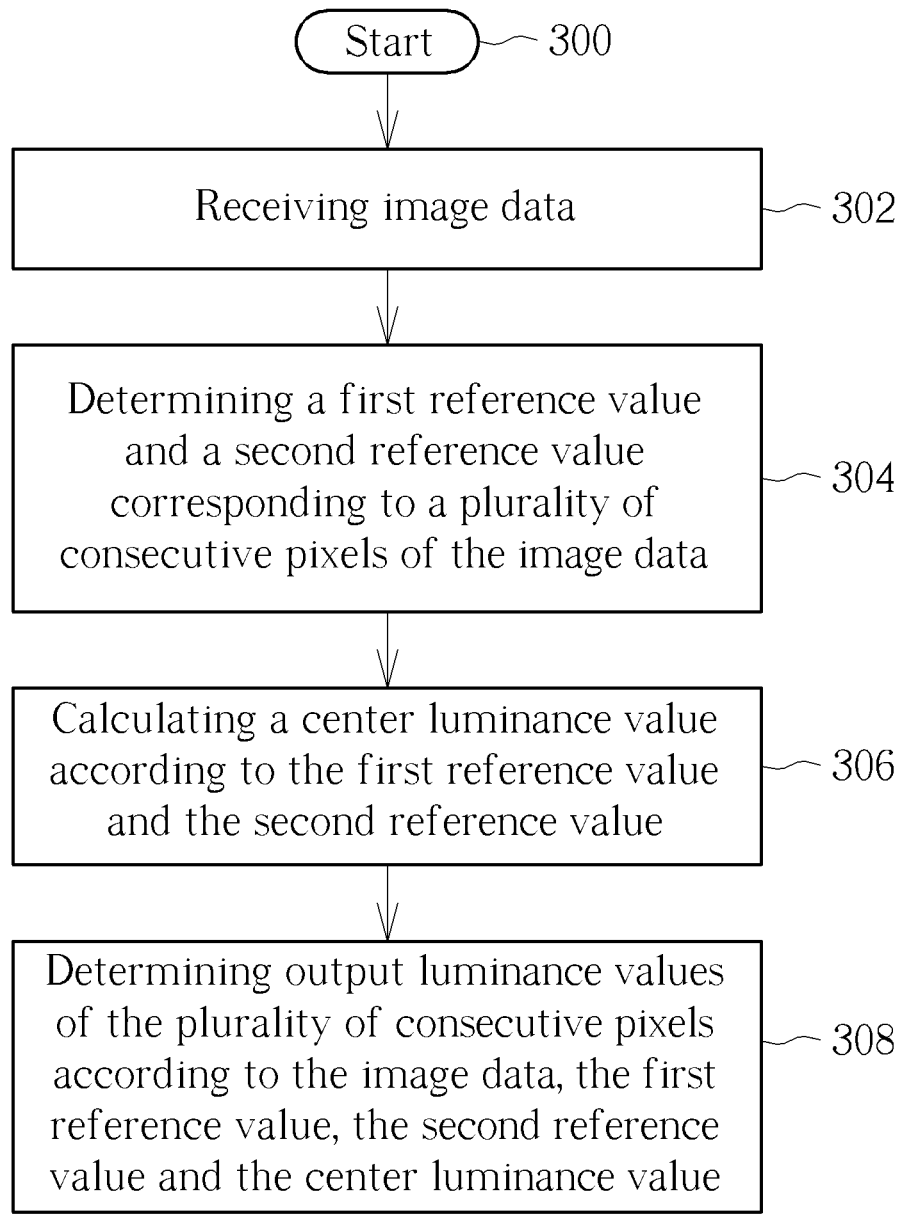
FIG. 3 is a flow chart of an image processing method according to an embodiment of the invention.

FIG. 3 is a flow chart of an image processing method according to an embodiment of the invention. Referring to the illustrations of the embodiments illustrated above, the image processing method comprises the following steps:

Step 300: Starting the image processing procedure.

Step 302: Receiving image data.

Step 304: Determining (or calculating) a first reference value and a second reference value corresponding to a plurality of consecutive pixels of the image data, wherein the first reference value and the second reference value are respectively a highest luminance value and a lowest luminance value of two edge pixels of the plurality of consecutive pixels after being processed by the image processing method.

Step 306: Calculating a center luminance value according to the first reference value and the second reference value.

Step 308: Determining (or calculating) output luminance values of the plurality of consecutive pixels according to the image data, the first reference value, the second reference value and the center luminance value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
a receiving circuit, configured to receive image data;
a reference value calculating circuit, configured to determine a first reference value and a second reference value corresponding to a plurality of consecutive pixels of the image data, wherein the first reference value and the second reference value are respectively a highest luminance value and a lowest luminance value of two edge pixels of the plurality of consecutive pixels after being processed by the image processing circuit;
a center luminance value calculating circuit, configured to calculate a center luminance value according to the first reference value and the second reference value; and
an output circuit, configured to determine output luminance values of the plurality of consecutive pixels according to the image data, the first reference value, the second reference value and the center luminance value;
wherein for each pixel of the plurality of consecutive pixels, the reference value calculating circuit is configured to calculate a cumulative luminance value increment and a cumulative luminance value decrement, and determine the first reference value and the second reference value according to luminance values of the plurality of consecutive pixels, the cumulative luminance value increment and the cumulative luminance value decrement;
wherein the cumulative luminance value increment corresponding to a pixel is obtained by adding a subtraction result to the cumulative luminance value increment corresponding to the pixel at a previous position when the luminance value of the pixel is greater than the luminance value of the pixel at the previous position, wherein the subtraction result is calculated by subtracting the luminance value of the pixel at the previous position from the luminance value of the pixel.

2. The image processing circuit of claim 1, wherein the cumulative luminance value decrement corresponding to the pixel is obtained by adding another subtraction result to the cumulative luminance value decrement corresponding to the pixel at the previous position when the luminance value of the pixel is smaller than the luminance value of the pixel at the previous position, wherein the another subtraction result is calculated by subtracting the luminance value of the pixel from the luminance value of the pixel at the previous position.

3. The image processing circuit of claim 2, wherein for each pixel of the plurality of consecutive pixels, the reference value calculating circuit is configured to subtract the cumulative luminance value decrement corresponding to the pixel from the luminance value of the pixel to obtain an initial first reference value, add the cumulative luminance value increment corresponding to the pixel to the luminance value of the pixel to obtain an initial second reference value, and determine the first reference value according to the initial first reference values of the plurality of consecutive pixels and determine the second reference value according to the initial second reference values of the plurality of consecutive pixels.

4. The image processing circuit of claim 3, wherein the first reference value is the highest value among the initial first reference values of the plurality of consecutive pixels and the second reference value is the lowest value among the initial second reference values of the plurality of consecutive pixels.

5. The image processing circuit of claim 3, wherein the reference value calculating circuit is further configured to determine an adjustment value according to a difference between the luminance values and the initial first reference values of the plurality of consecutive pixels or a difference between the luminance values and the initial second reference values of the plurality of consecutive pixels; and the reference value calculating circuit is further configured to determine the first reference value according to the initial first reference values of the plurality of consecutive pixels and the adjustment value, and determine the second reference value according to the initial second reference values of the plurality of consecutive pixels and the adjustment value.

6. The image processing circuit of claim 1, wherein the center luminance value calculating circuit is configured to perform a weighted average operation on the first reference value and the second reference value to generate an initial central luminance value, and calculate the center luminance value according to the initial central luminance value.

7. The image processing circuit of claim 6, wherein the center luminance value calculating circuit is configured to calculate an object main body component according to a difference between a peak value and a valley value of the luminance values of the plurality of consecutive pixels, and calculate the center luminance value according to the initial central luminance value and the object main body component.

8. The image processing circuit of claim 1, wherein for each pixel, the output circuit is configured to generate the output luminance value of the pixel according to the luminance value of the pixel, the center luminance value and a sharpness adjustment ratio, wherein the output luminance value of the pixel is not higher than the first reference value and is not lower than the second reference value.

9. An image processing method, comprising:
receiving image data;
determining a first reference value and a second reference value corresponding to a plurality of consecutive pixels of the image data, wherein the first reference value and the second reference value are respectively a highest luminance value and a lowest luminance value of two edge pixels of the plurality of consecutive pixels after being processed by the image processing method;
calculating a center luminance value according to the first reference value and the second reference value; and
determining output luminance values of the plurality of consecutive pixels according to the image data, the first reference value, the second reference value and the center luminance value;
wherein the step of determining the first reference value and the second reference value corresponding to the plurality of consecutive pixels of the image data further comprises:
for each pixel of the plurality of consecutive pixels, calculating a cumulative luminance value increment and a cumulative luminance value decrement; and
determining the first reference value and the second reference value according to luminance values of the plurality of consecutive pixels, the cumulative luminance value increment and the cumulative luminance value decrement;
wherein the cumulative luminance value increment corresponding to a pixel is obtained by adding a subtraction result to the cumulative luminance value increment corresponding to the pixel at a previous position when the luminance value of the pixel is greater than the luminance value of the pixel at the previous position, wherein the subtraction result is calculated by subtracting the luminance value of the pixel at the previous position from the luminance value of the pixel.

10. The image processing method of claim 9, wherein the cumulative luminance value decrement corresponding to the pixel is obtained by adding another subtraction result to the cumulative luminance value decrement corresponding to the pixel at the previous position when the luminance value of the pixel is smaller than the luminance value of the pixel at the previous position, wherein the another subtraction result is calculated by subtracting the luminance value of the pixel from the luminance value of the pixel at the previous position.

11. The image processing method of claim 10, wherein the step of determining the first reference value and the second reference value according to luminance values of the plurality of consecutive pixels, the cumulative luminance value increment and the cumulative luminance value decrement further comprises:
for each pixel of the plurality of consecutive pixels, subtracting the cumulative luminance value decrement corresponding to the pixel from the luminance value of the pixel to obtain an initial first reference value and adding the cumulative luminance value increment corresponding to the pixel to the luminance value of the pixel to obtain an initial second reference value; and
determining the first reference value according to the initial first reference values of the plurality of consecutive pixels and determining the second reference value according to the initial second reference values of the plurality of consecutive pixels.

12. The image processing method of claim 11, wherein the first reference value is the highest value among the initial first reference values of the plurality of consecutive pixels and the second reference value is the lowest value among the initial second reference values of the plurality of consecutive pixels.

13. The image processing method of claim 9, wherein the step of determining the first reference value and the second reference value according to luminance values of the plurality of consecutive pixels, the cumulative luminance value increment and the cumulative luminance value decrement further comprises:
for each pixel of the plurality of consecutive pixels, subtracting the cumulative luminance value decrement corresponding to the pixel from the luminance value of the pixel to obtain an initial first reference value and adding the cumulative luminance value increment corresponding to the pixel to the luminance value of the pixel to obtain an initial second reference value;
determining an adjustment value according to a difference between the luminance values and the initial first reference values of the plurality of consecutive pixels or a difference between the luminance values and the initial second reference values of the plurality of consecutive pixels; and determining the first reference value according to the initial first reference values of the plurality of consecutive pixels and the adjustment value, and determining the second reference value according to the initial second reference values of the plurality of consecutive pixels and the adjustment value.

14. The image processing method of claim 9, wherein the step of calculating the center luminance value according to the first reference value and the second reference value further comprises:
   performing a weighted average operation on the first reference value and the second reference value to generate an initial central luminance value; and
   calculating the center luminance value according to the initial central luminance value.

15. The image processing method of claim 14, further comprising:
   calculating an object main body component according to a difference between a peak value and a valley value of the luminance values of the plurality of consecutive pixels, and wherein the step of calculating the center luminance value according to the initial central luminance value further comprises:
   calculating the center luminance value according to the initial central luminance value and the object main body component.

16. The image processing method of claim 9, wherein the step of determining output luminance values of the plurality of consecutive pixels according to the image data, the first reference value, the second reference value and the center luminance value further comprises:
   for each pixel, generating the output luminance value of the pixel according to the luminance value of the pixel, the center luminance value and a sharpness adjustment ratio, wherein the output luminance value of the pixel is not higher than the first reference value and is not lower than the second reference value.

* * * * *